April 7, 1953 L. W. VAN DUSEN 2,634,076
VACUUM FIXTURE
Filed July 11, 1949 2 SHEETS—SHEET 1
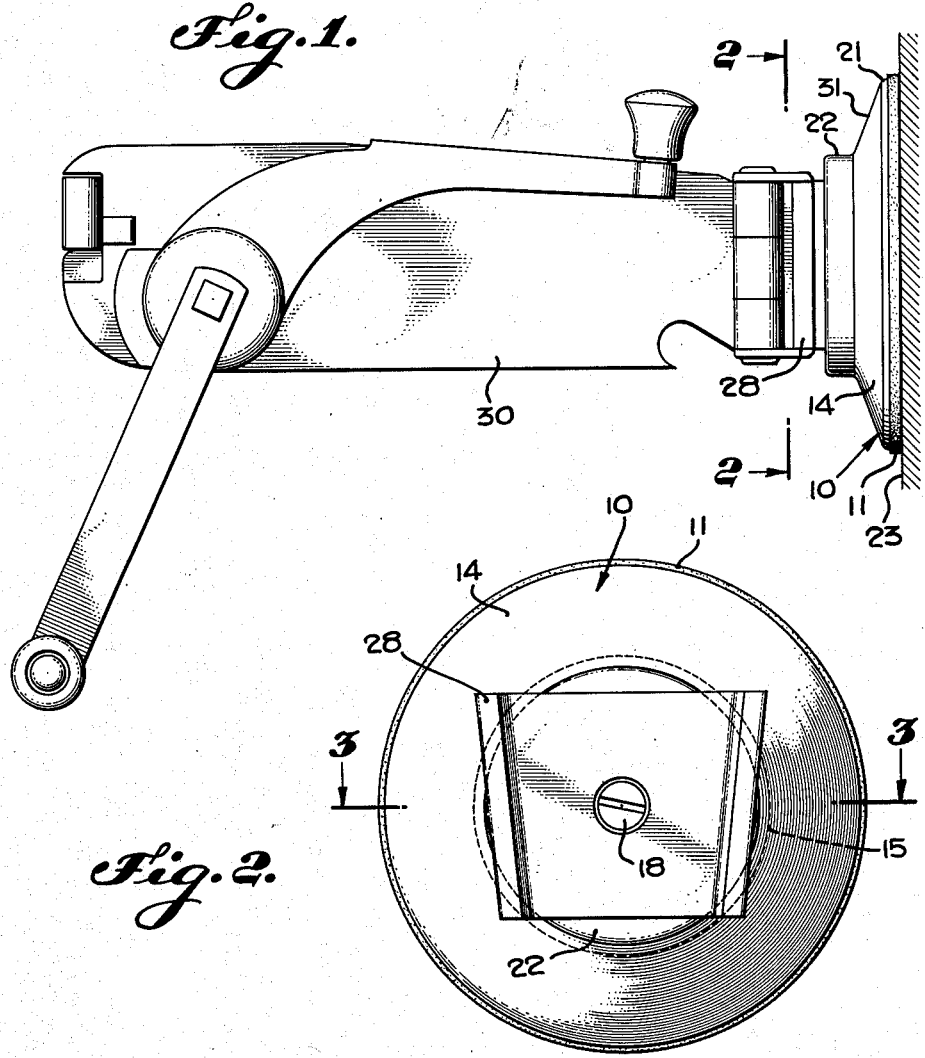
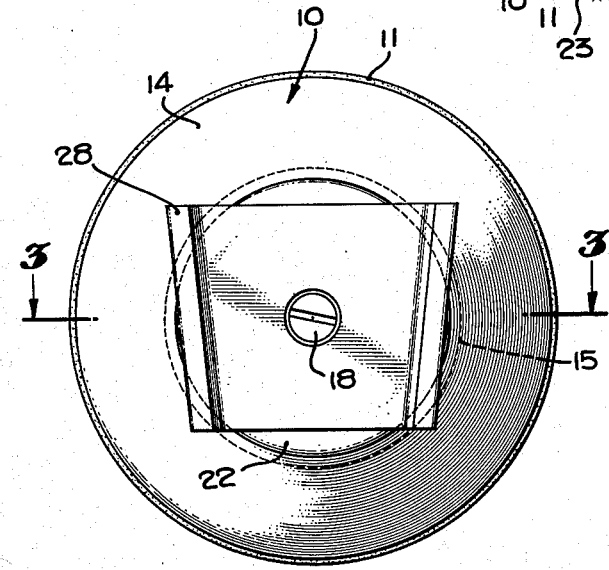
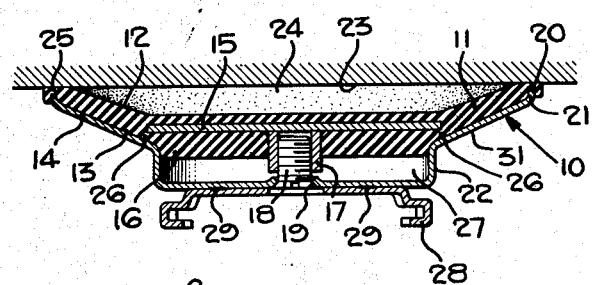
LAURENCE W. VAN DUSEN,
INVENTOR.
BY Lyon & Lyon
ATTORNEYS April 7, 1953   L. W. VAN DUSEN   2,634,076
VACUUM FIXTURE
Filed July 11, 1949   2 SHEETS—SHEET 2
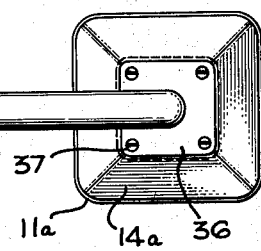
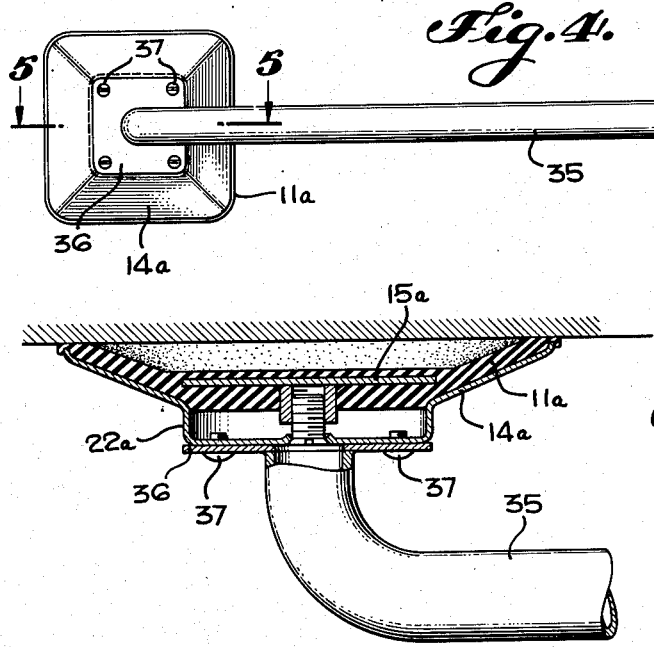
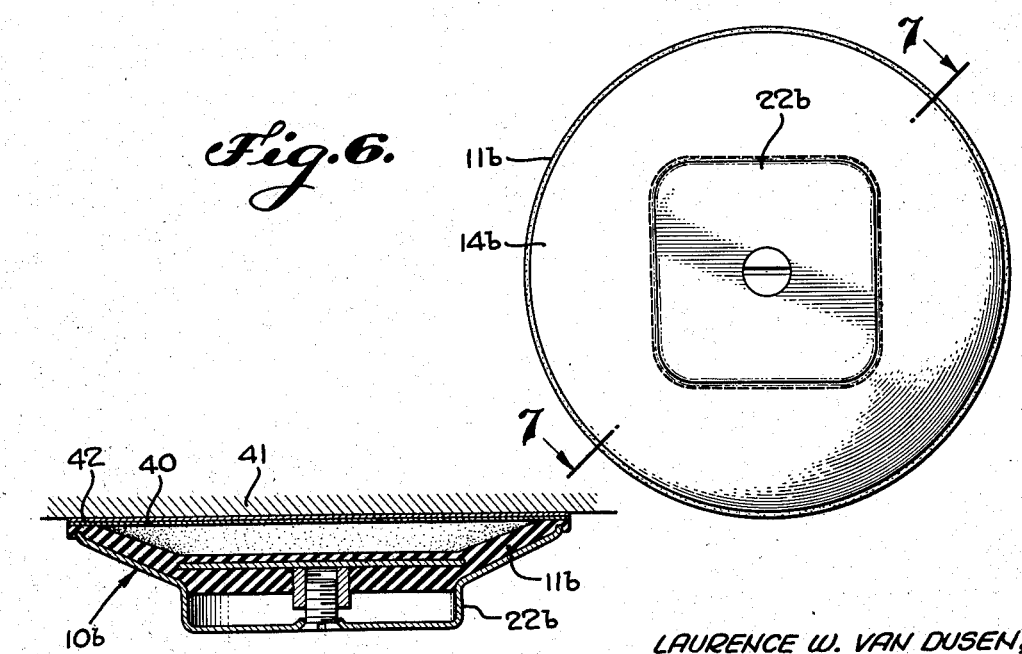
LAURENCE W. VAN DUSEN,
INVENTOR.
BY *Lyon & Lyon*
ATTORNEYS Patented Apr. 7, 1953

2,634,076

UNITED STATES PATENT OFFICE 2,634,076

VACUUM FIXTURE

Laurence W. Van Dusen, Escondido, Calif., assignor to Van Dusen Engineering Company, Escondido, Calif., a copartnership Application July 11, 1949, Serial No. 103,970

8 Claims. (Cl. 248—206)

This invention relates to vacuum fixtures and is particularly directed to improvements in attachment devices using the principle of a suction cup.

While the use of suction cups as attaching devices is very old in commercial applications, such suction cups have not been extensively employed for permanent attachment devices because the possibility of leakage of air ordinarily renders such devices unreliable for many installations. There are many commercial uses for suction operated attachment devices providing the devices can be relied upon to make a permanent attachment not subject to failure upon leakage of air pressure into the vacuum space. Ordinary rubber or rubber-like suction cups are not impervious to the passage of air therethrough even under the relatively low atmospheric pressure of approximately 15 p. s. i.

It is the principal object of my invention to provide a vacuum operated attachment device which substantially eliminates the possibility of leakage under atmospheric pressure, and accordingly provides a permanent attachment means.

Another object is to provide a vacuum operated attachment device employing a suction cup and a metal shield therefor and arranged in a manner so that atmospheric air can enter the vacuum space only by passing through a zone of rubber-like material under compression.

Another object is to provide a device of this type employing a metal shield which operates in conjunction with a rubber-like suction cup substantially to eliminate the danger of entrance of air into the suction space.

Another object is to provide a vacuum operated attachment device of this type having mechanical means for enlarging the vacuum space within the rubber-like suction cup.

Another object is to provide a device of this type having a minimum number of working parts substantially enclosed within a metallic shell conforming to the over-all shape and size of a rubber-like suction cup.

Another object is to provide a suction attachment device which may be manufactured economically on a quantity basis and which may conveniently be produced in various sizes and shapes as desired.

Another object is to provide a vacuum operated attachment device which may be effectively applied to porous surfaces such as, for example, wood or plaster.

Other and more detailed objects and advantages will appear hereinafter.

In the drawings:

Figure 1 shows a can opener mechanism secured to a vertical wall by means of an attachment device embodying my invention.

Figure 2 is a side elevation of the attachment device taken in the direction of the lines 2—2 as shown in Figure 1, the can opener mechanism being removed from its releasable support.

Figure 3 is a transverse sectional view taken on the lines 3—3 as shown in Figure 2.

Figure 4 is a side elevation showing a modified form of my invention used in connection with the support of a towel rack.

Figure 5 is a sectional elevation taken substantially on the lines 5—5 as shown in Figure 4.

Figure 6 is an elevation of a further modified form of my invention.

Figure 7 is a transverse sectional elevation taken substantially on the lines 7—7 as shown in Figure 6.

Referring to the drawings, the vacuum operated attachment device generally designated 10 includes a suction cup 11 which may be formed of natural or synthetic rubber or rubber compound. This suction cup has an inner dished or concave surface 12 and an outer surface 13 adapted to be received within a metallic shell or housing 14. The shell 14 includes an outwardly directed boss 22 having a top wall and a side wall disposed at substantially right angles thereto. An annular wall 31 surrounds the boss and may be conical or slope away from said side wall toward the suction cup and terminate in a continuous lip 21. A nonresilient plate or disk 15 is vulcanized within the central body portion 16 of the suction cup 11 and is provided with a threaded tube 17 which extends through the back surface of the resilient cup 11 in a central position. A screw 18 extends through an aperture 19 formed centrally of the shell 14 and the threads of the screw engage the threads of the tube 17. The threaded parts 17 and 18 constitute tensioning elements.

The outer circumference of the resilient cup 11 is provided with a groove 20 to receive the peripheral lip 21 on the metallic shell 14. The plate 15 is preferably shaped to correspond with the outwardly directed boss 22 on the shell 14. Thus, if the boss 22 is circular the plate 15 is likewise circular, while if it is substantially square or rectangular the plate 15 takes the same shape. In either event, the plate 15 is larger than the entrance to the boss cavity or greater in size than the inner dimension of the annular wall 31.

The device 10 is secured by vacuum on any suitable mounting surface 23 by first moistening the inner dished surface 12 of the cup 11 and manually pushing it against the surface 23 to expel substantially all of the air in the vacuum space 24 between the surfaces 12 and 23. When the cup 11 is initially installed the shell 14 and screw 18 are not present, and therefore the back surface 13 of the suction cup 11 may be contacted directly for the purpose of expelling air from the space 24. When the inner dished surface has been distorted into substantially full contact with the mounting surface 23, the metallic shell 13 is placed in position with the lip 21 in the groove 20. The screw 18 is then inserted through the central aperture 19 and is threaded into the tube 17. A screw driver is used to turn the screw, and in this way the plate 15 is moved forcibly in a direction away from the surface 23 toward the wall 31, thereby increasing the size of the vacuum space 24. Atmospheric pressure exerted on the shell 13 applies a relatively high unit stress to the resilient material of the suction cup 11 in the region adjacent the groove 20, and the outer annular portion 25 of the cup 11 is thus tightly held against the surface 23.

The device 10 may be installed without initial disassembly therefrom of the shell 14 and screw 18 merely by loosening the screw 18 to a point where it protrudes a substantial distance from the end face of the boss 22. The inner dished surface 12 of the cup 11 is then moistened and the device placed in position on the mounting surface 23 whereupon the head of the screw may be pushed inwardly with the thumb or some other blunt object. This thrust is transmitted to the tube 17 and plate 15, and the inner surface of the cup 11 is thus flattened against the mounting surface, expelling substantially all of the air from the space 24. The screw 18 may then be turned in the manner described above to pull the plate 15 and central portion of the cup away from the mounting surface.

An important feature of my invention is that air is effectively excluded from the vacuum space 24 and is prevented from leaking into it from the atmosphere outside the shell 13. Leakage is prevented by requiring that any air which would reach the vacuum space 24 must pass through a zone of rubber under compression, and it is well known that rubber under compression is an effective bar for air under ordinary pressures. The annular zone 25 of rubber which lies between the lip 21 and the surface 23 is held under compression. In a similar manner, the annular zone 26 of rubber which lies between the periphery of the internal disk 15 and the closely adjacent intermediate wall portion 31 of the metallic shell 14 also is confined under compression. In order for atmospheric air to leak into the vacuum space 24 it must pass either through the zone 25 or through the zone 26. Since both of these zones constitute rubber-like material under compression, two effective barriers are provided against leakage of air into the space 24. The space 27 within the boss 22 is not air-tight since air can enter through the aperture 19, but in order for air in the space 27 to reach the vacuum space 24 it must pass through the compression zone 26 and then through the body of the rubber cup 11, since the metallic tube 17 and metallic plate 15 prevent passage of air directly through the central portion 16 of the cup 11.

It will be observed that the mechanism for moving the imbedded plate 15 in a direction away from the mounting surface 23 is entirely confined with the outline of the metallic shell 14 and does not involve any bulky unsightly or protruding parts. It will also be noted that the wall 31 limits movement of the plate 15 toward the boss cavity so that the suction cup, while compressed against the wall 31, is maintained spaced from the inner surface of the top wall of the boss 22.

Any suitable or desirable form of attachment bracket 28 may be connected to the shell 14. As shown in the drawings the bracket 28 may be secured to the shell by means of spot welding 29, and this bracket may provide a wedge-shaped socket for any desired device such as, for example, the can opener 30. As shown in Figure 1 the can opener 30 may be of any conventional style and may be removably mounted in a wedge-shaped seat provided by the bracket 28.

The suction cup and its enclosing metallic shell need not be circular in outline but may be made in any desirable shape. As shown in Figure 4 the suction cup 11a is formed as a square with rounded corners and the metallic shell 14a is of corresponding shape. This form may be employed as desired for supporting a towel rack 35. The detailed construction of the cup 11a, shell 13a and imbedded plate 15a is substantially the same as that described in connection with that form of my invention shown in Figures 1–3. The towel rack 35 may be provided with brackets 36 at its ends which may be connected in any convenient fashion to the boss 22a on the shell 14a. The connection may take the form of removable screw members 37. The boss 22a may be circular, or as shown in the drawings may be substantially square with rounded corners to conform to the shape of the bracket 36.

Figure 6 shows a modified form of device embodying my invention in which the central raised boss 22b is square with rounded corners while the suction cup 11b and shell 13b are both circular on their outer periphery. Figure 6 shows that the shape of the central boss 22b and the external shape of the suction cup and metallic shell need not be the same, and thus a circular boss may be mounted on a substantially square shell, and vice versa.

The vacuum operated attachment devices described above function satisfactorily on surfaces such as glass, tile, metal, enamel, etc., but ordinarily cannot be used on porous or irregular surfaces such as, for example, plaster or wood, because air can pass through the surfaces and leak into the vacuum space. In order to remedy this shortcoming and to permit the device to be used on wood, plaster and other porous surfaces, I provide a thin metallic sheet 40 which is the same shape and size as the suction cup 11b. This sheet 40 may be very thin and may be formed of brass, steel or other suitable material impervious to the passage of air under ordinary pressures. This metallic sheet 40 is bonded to the wood or plaster support member 41 by means of suitable glue or other adhesive 42. The union established by the glue need only withstand a maximum unit pressure of approximately 15 p. s. i., and therefore the type of glue or cement or other adhesive which is used is not critical. After the thin metallic sheet 40 has been glued to the porous wall 41, the suction attachment device 10b may be mounted on the sheet 40 in the same manner as described above. While I have shown and described the vacuum operated attachment device only in connection with the support for a can opener and a towel rack, it will be understood that many and other varied uses of the device are contemplated, and its usefulness is in no wise limited to these particular applications.

Having fully described my invention, it is to be understood that I do not wish to be limited to the details herein set forth, but my invention is of the full scope of the appended claims.

I claim:

1. A vacuum-operated attachment device, comprising in combination: a resilient suction cup having a nonresilient plate element embedded centrally therein, a nonresilient shell enclosing a back face of the suction cup and having a continuous lip engaging the outer rim of the suction cup, the shell having a central flat portion and an intermediate tapered portion extending from the central portion to said continuous lip, and mechanical means operatively conecting the central portion of the shell with the non-resilient plate element for moving the central portion of the suction cup in a direction toward the central portion of the shell to produce a vacuum space within the suction cup, the intermediate tapered portion of the shell overlying an embedded portion of the plate element, whereby a continuous portion of the suction cup may be placed under compression between the plate element and the intermediate tapered portion of the shell, with the suction cup spaced from the inner surface of the central portion of the shell.

2. A vacuum-operated attachment device, comprising in combination: a resilient suction cup having a nonresilient impervious plate element embedded therein, a nonresilient impervious shell having a continuous lip engaging the outer rim of the cup and adapted to compress the outer rim against a mounting surface to form a first continuous zone to compression in said cup, the shell having a central portion and a continuous portion surrounding the central portion and overlying the outer margin of the plate element, the central portion being disposed farther from the plate element than said continuous portion, and mechanical means operatively connecting the plate element with said shell for moving the central portion of the suction cup in a direction toward the central portion of the shell to produce a vacuum space in the suction cup and to compress a portion of the suction cup against the continuous portion of the shell to form a second continuous zone of compression in said cup between the shell and the plate element with the suction cup spaced from the inner surface of the central portion, whereby a substantially impervious seal for the vacuum space is defined by the shell, the plate element, and the first and second zones of compression.

3. A vacuum-operated attachment device, comprising: a substantially circular resilient suction cup having an outer face adapted to be initially pressed against a supporting surface; a substantially circular rigid shell overlying said suction cup, said shell having a central outwardly directed boss including a top wall and a cylindrical side wall extending generally at right angles thereto and cooperating therewith to form a cavity, said shell also including an annular conical wall extending outwardly and sloping away from said side wall toward said suction cup and terminating in a continuous lip engaging the adjacent side of said suction cup near its outer rim; a rigid disk having its outer margin embedded in said suction cup, said disk having an outer diameter slightly greater than that of the inner diameter of said conical wall and confronting the cavity in said boss, said top wall having an aperture extending therethrough; and means extending through said aperture and cavity and being connected with said disk and operable to move said disk to a position adjacent said cavity, such movement of said disk being effective to automatically create a vacuum condition between the outer face of said suction cup and a supporting surface to thereby cause said lip to compress the outer rim of said suction cup against the supporting surface to form a first continuous zone of compression in said suction cup and also serving to compress the portion of the suction cup disposed between the outer marginal portion of said disk and the adjacent inner surface of said conical wall to form a second continuous zone of compression in said suction cup.

4. A vacuum-operated attachment device, comprising: a resilient suction cup having an outer face adapted to be initially pressed against a supporting surface; a rigid shell overlying said suction cup, said shell having an outwardly directed boss including a top wall disposed centrally of said shell with a side wall extending substantially at right angles thereto and cooperating therewith to form a cavity, said shell also including an intermediate wall extending outwardly from said side wall and terminating in a continuous lip engaging the adjacent side of said suction cup near its outer rim; a rigid plate embedded centrally in said suction cup, said plate being slightly larger in size than the inner dimension of said intermediate wall and confronting the cavity in said boss, said top wall having an aperture formed therein; and means extending through said aperture and cavity and being connected with said plate and operable to move said plate a desired distance toward said cavity, such movement of said plate being effective to create a vacuum condition between the outer face of said suction cup and a supporting surface to thereby cause said lip to compress the rim of said suction cup against the supporting surface to form a first continuous zone of compression in said suction cup and also serving to compress the portion of the suction cup disposed between said plate and the adjacent inner surface of said intermediate wall to form a second continuous zone of compression in said suction cup.

5. A vacuum-operated attachment device, comprising: a resilient suction cup having an outer face adapted to be initially pressed against a supporting surface; a rigid shell, said shell having a central portion and an annular portion surrounding said central portion, said annular portion overlying a portion of the inner face of said suction cup and being disposed in a plane different from that of said central portion and extending from said central portion toward said suction cup and terminating in a continuous lip engaging said suction cup adjacent its outer rim; a rigid plate disposed centrally of said suction cup and bonded thereto, said plate being larger in size than the inner dimension of said annular portion so that movement of said plate toward said central portion may be limited by said annular portion to maintain the suction cup spaced from the inner surface of said central portion, said central portion having an aperture extending therethrough; and means connected with said plate and extending through said aperture and being operable from the exterior of said shell to move said plate toward said annular portion.

6. A vacuum-operated attachment device, comprising: a resilient suction cup having an outer face adapted to be initially pressed against a supporting surface; housing means including a generally cylindrical portion and an annular wall overlying portion of the inner face of said suction cup and being disposed in a plane different from that of said cylindrical portion and extending from said cylindrical portion toward said suction cup and terminating in a continuous lip engaging said suction cup adjacent its outer rim; a rigid plate disposed centrally of said suction cup and bonded thereto, said plate being larger in size than the inner dimension of said annular wall so that movement of said plate toward said cylindrical portion may be limited by said annular wall to maintain the suction cup spaced from the inner surface of said cylindrical portion, said cylindrical portion having an aperture extending therethrough; and means connected with said plate and extending through said aperture and being operable from the exterior of said cylindrical portion to move said plate toward said annular wall.

7. In a vacuum-operated attachment device, the combination of a circular resilient suction cup having a concave contact surface in normal unstressed condition, a nonresilient disk member embedded in the central portion of said suction cup, a nonresilient shell having an annular lip engaging the outer rim of the cup and adapted to compress the outer rim against a mounting surface to form a first zone of compression, a first element fixed to the disk member and protruding from a back face of the suction cup, and a second element operable from the exterior of said shell and cooperating with the first element for sequentially moving the central portion of the suction cup in a direction to flatten the same against the mounting surface and then in a direction to pull the central portion of the suction cup away from the mounting surface to produce a vacuum space therebetween, a portion of the shell lying nearer to the embedded peripheral portion of the plate element than to said central opening so that turning of the second element clamps a second continuous zone of the suction cup under compression, whereby a substantially impervious sleeve is defined by the shell, the plate element and the first and second zones of compression.

8. A suction type fastener, comprising in combination: a resilient suction cup, a nonresilient shell enclosing a back face of the suction cup and having a continuous peripheral lip adapted to compress a peripheral portion of the suction cup against a mounting surface to form a first continuous zone of compression in said suction cup, a nonresilient plate element embedded within the central portion of the suction cup, an internally threaded element fixed to the nonresilient plate element and protruding from the back face of the suction cup, the nonresilient shell having a countersunk central opening, and an externally threaded screw element extending through the opening into threaded engagement with said internally threaded element, said screw element having a head received within said countersunk opening whereby said internally threaded element and said screw element are located entirely within the outer boundaries of the shell, a portion of the shell lying nearer to the embedded peripheral portion of the plate element than to said central opening so that turning of the externally threaded screw element clamps a second continuous zone of the suction cup under compression, whereby a substantially impervious seal is defined by the shell, the plate element and the first and second zones of compression.

LAURENCE W. VAN DUSEN.

REFERENCES CITED

The following references are of record in the file of this patent:

UNITED STATES PATENTS

| Number | Name | Date |
|---|---|---|
| 1,119,177 | Krafft | Dec. 1, 1914 |
| 2,028,640 | Zaiger | Jan. 21, 1936 |
| 2,233,870 | Muter | Mar. 4, 1941 |

FOREIGN PATENTS

| Number | Country | Date |
|---|---|---|
| 315,425 | Great Britain | Sept. 25, 1930 |
| 383,690 | Great Britain | Nov. 24, 1932 |
| 446,868 | Great Britain | May 7, 1936 |
| 470,723 | Great Britain | Aug. 20, 1937 |
| 651,820 | Germany | Oct. 20, 1937 |